Patented Jan. 21, 1941

2,229,416

UNITED STATES PATENT OFFICE 2,229,416

GLASS BATCH AND DECOLORIZING AGENT THEREFOR

Aaron K. Lyle, West Hartford, Conn., assignor to Hartford-Empire Company, Hartford, Conn., a corporation of Delaware No Drawing. Application August 25, 1938, Serial No. 226,685

7 Claims. (Cl. 106—36.1)

The present invention relates to the preparation of glass, and particularly to the use therein of a new and more efficient decolorizing agent.

Heretofore in making colorless glasses as, for example, the soda-lime glasses commonly used in bottles or window glass, it has been customary to employ selenium as a decolorizing agent.

As selenium boils at 688° C., substantially below the melting point of the other constituents of the glass batch, a considerable portion of the selenium is lost through volatilization before the fusion of the glass-making ingredients takes place. Although selenium is employed in the batch in relatively small quantities, its cost is sufficiently high to make this loss of some importance. Moreover, the volatilization of selenium is not controllable, so that the color of the glass being made frequently varies from time to time, requiring frequent adjustments of the amounts of selenium introduced into the furnace in order to maintain constant production of colorless glass.

I have descovered that lead selenide may be employed as a decolorizer in lieu of selenium, and that its use results in a clear, colorless glass in every way comparable to that made by the use of selenium.

As lead selenide melts at a higher temperature than sodium carbonate, potassium carbonate and other fluxes which may be introduced into the batch, and as it appears to remain a stable composition below its melting point, the loss of selenium by volatilization is eliminated or greatly reduced, resulting in a saving of as much as 20% of the selenium formerly required, and also resulting in a stable operation during which the glass melted is uniformly clear and colorless.

I am advised that certain other selenides as, for example, sodium selenide and zinc selenide, have been proposed as decolorizers, and that their use in some cases has resulted in clear colorless glass. However, it has been found that no advantage was obtained in the reduction of the amount of selenium required. Apparently these other compounds, even those having relatively high melting points, are not stable and appear to break down prior to the melting of the other glass constituents, so that the selenium, freed from the compound, volatilizes and is lost, as in the case of elemental selenium.

Selenium has not heretofore been employed as a decolorizing agent in clear colorless glasses containing lead, though it has been employed in such glass batches to produce amber glass. It has been generally believed that even small quantities of lead in batches using selenium as a decolorizer result in glass of a dark, dull shade.

When, however, selenium is introduced into the batch as lead selenide in suitable quantities, in accordance with my invention, a clear, brilliant colorless glass may be produced.

The lead selenide may be prepared in known manner as, for example, by direct reaction between selenium and lead; or natural lead selenide, clausthalite, may be used.

In the preparation of selenium for use as a decolorizer, it is customary to prepare a mixture of feldspar, soda ash or some other diluting material, so that the decolorizer will contain from 10 to 15% selenium. The same procedure may be used with lead selenide.

A satisfactory decolorizer can be made by mixing 362 parts of lead selenide with 638 parts of ground feldspar.

It is also customary in the use of selenium, to modify the color produced by the selenium, by the use of a second decolorizer containing from 1 to 3% cobalt oxide, in addition to the 10% of selenium, or by use of a separate mixture containing only the cobalt oxide diluted to give 1 to 3% mixture.

This practice may also be followed when the lead selenide is used as a decolorizer.

My invention contemplates the employment of lead selenide as the decolorizing agent in any glass batch in which selenium may be used for that purpose.

The following is an example of a batch used to produce a decolorized bottle glass, and in which selenium is employed as a decolorizer:

| | | |
|---|---|---|
| Sand | pounds | 1000 |
| Soda ash | do | 380 |
| Limestone | do | 110 |
| Burnt dolomite | do | 75 |
| Feldspar | do | 16 |
| Salt cake | do | 3 |
| Borax | do | 18 |
| Arsenous oxide | do | 1 |
| Niter | do | 2 |
| Decolorizer 12½% Se | ounces | 5.0 |
| Decolorizer 12½% Se plus 3% cobalt oxide | do | 1.5 |

A satisfactory bottle glass may be made by substituting for the decolorizer in the foregoing example, the following:

| | Ounces |
|---|---|
| Lead selenide decolorizer 10% Se | 5 |
| Lead selenide decolorizer 10% Se plus 3% cobalt oxide | 1.5 |

It is to be noted that in the batch given, selenium amounts to .8125 ounce, whereas when the lead selenide is substituted, selenium is present only to the extent of .65 ounce.

In addition to its use as a decolorizer, lead selenide may also be used as a source of selenium for the manufacture of pink, rose colored or ruby glasses.

The following batch is an example of one which produces pink glass:

| | Pounds |
|---|---|
| Sand | 1000 |
| Soda ash | 280 |
| Potash | 160 |
| Dolomite | 150 |
| Borax | 3 |
| Arsenic | 5 |
| Niter | 50 |
| Lead selenide | 3 |

The ruby glass may be produced from the following batch:

| | Pounds |
|---|---|
| Sand | 1000 |
| Soda | 400 |
| Zinc oxide | 100 |
| Borax | 65 |
| Cadmium sulfide | 20 |
| Lead selenide | 14 |

Having described my invention, I claim:

1. A decolorizer for glass batch comprising lead selenide and cobalt oxide.

2. A batch for glass comprising sand, alkali and lead selenide.

3. A batch for glass comprising sand, an alkali, limestone and lead selenide.

4. A batch for glass comprising sand, an alkali, lead selenide and cobalt oxide.

5. A batch for pink glass, comprising sand, an alkali including at least some potash, and an amount of lead selenide sufficient to provide the desired pink coloration to the glass.

6. A batch for ruby glass, comprising sand, an alkali, zinc oxide, a cadmium compound and an amount of lead selenide sufficient, in conjunction with the other ingredients aforesaid, to provide the desired ruby coloration to the glass.

7. A batch in accordance with claim 2, wherein the lead selenide is used in the form of the natural mineral, clausthalite.

AARON K. LYLE.